(12) United States Patent
Brugman et al.

(10) Patent No.: US 8,107,593 B2
(45) Date of Patent: Jan. 31, 2012

(54) METHOD AND APPARATUS FOR TESTING NEW COPPER CONNECTIONS DURING MIGRATION FROM ANALOG NETWORK ELEMENTS TO NEXT GENERATION NETWORK (NGN) ELEMENTS

(75) Inventors: David L. Brugman, San Clemente, CA (US); Dennis W. Capecci, Finksburg, MD (US)

(73) Assignee: Alcatel Lucent, Paris (FR)

( * ) Notice: Subject to any disclaimer, the term of this patent is extended or adjusted under 35 U.S.C. 154(b) by 902 days.

(21) Appl. No.: 12/138,185

(22) Filed: Jun. 12, 2008

(65) Prior Publication Data

US 2009/0310756 A1    Dec. 17, 2009

(51) Int. Cl.
*H04M 1/24* (2006.01)
(52) U.S. Cl. .......... 379/1.01; 379/1.04; 379/2; 370/352
(58) Field of Classification Search ............ 379/1.01, 379/1.04, 2; 370/352
See application file for complete search history.

(56) References Cited

U.S. PATENT DOCUMENTS

| | | | |
|---|---|---|---|
| 4,334,129 A | 6/1982 | De Luca et al. | |
| 6,603,760 B1 * | 8/2003 | Smyk | 370/352 |
| 7,243,040 B1 * | 7/2007 | Mayock et al. | 702/122 |
| 7,535,850 B2 * | 5/2009 | Makowski et al. | 370/249 |
| 7,813,509 B2 * | 10/2010 | Yan et al. | 380/278 |
| 2006/0093094 A1 * | 5/2006 | Xing et al. | 379/1.02 |
| 2007/0154009 A1 * | 7/2007 | Cameron et al. | 379/373.02 |
| 2010/0111268 A1 * | 5/2010 | Brugman et al. | 379/1.03 |

FOREIGN PATENT DOCUMENTS

DE    195 00 142 A1    7/1996

* cited by examiner

*Primary Examiner* — Creighton Smith
(74) *Attorney, Agent, or Firm* — Fay Sharpe LLP

(57) ABSTRACT

This invention makes it possible to transparently test replacement functionality and optionally migrate subscribers on analog phone lines, served, for example, by PSTN Class 5 elements, to Next Generation Network (NGN) elements when copper co-termination is leveraged. The method and apparatus mechanizes replacement continuity verification to the NGN element from the analog dial tone port and the multi-element network changes required for real time per line per-migration, operational testing and optional migration to the NGN element. All of the network elements are accessible from a single device, the Control Computer used by this invention. Each line can be transparently tested and optionally migrated during a short time period when the subscriber is not using the analog line. In effect, this testing and optional migration is actually changing the state of the NGN element to operational for test purposes and if the tests pass, the analog port and associated DSLAM port can be optionally deactivated. This activity is accomplished in real time, with minimal service interruption to the subscriber. Support and routing databases may also be updated concurrently.

20 Claims, 3 Drawing Sheets

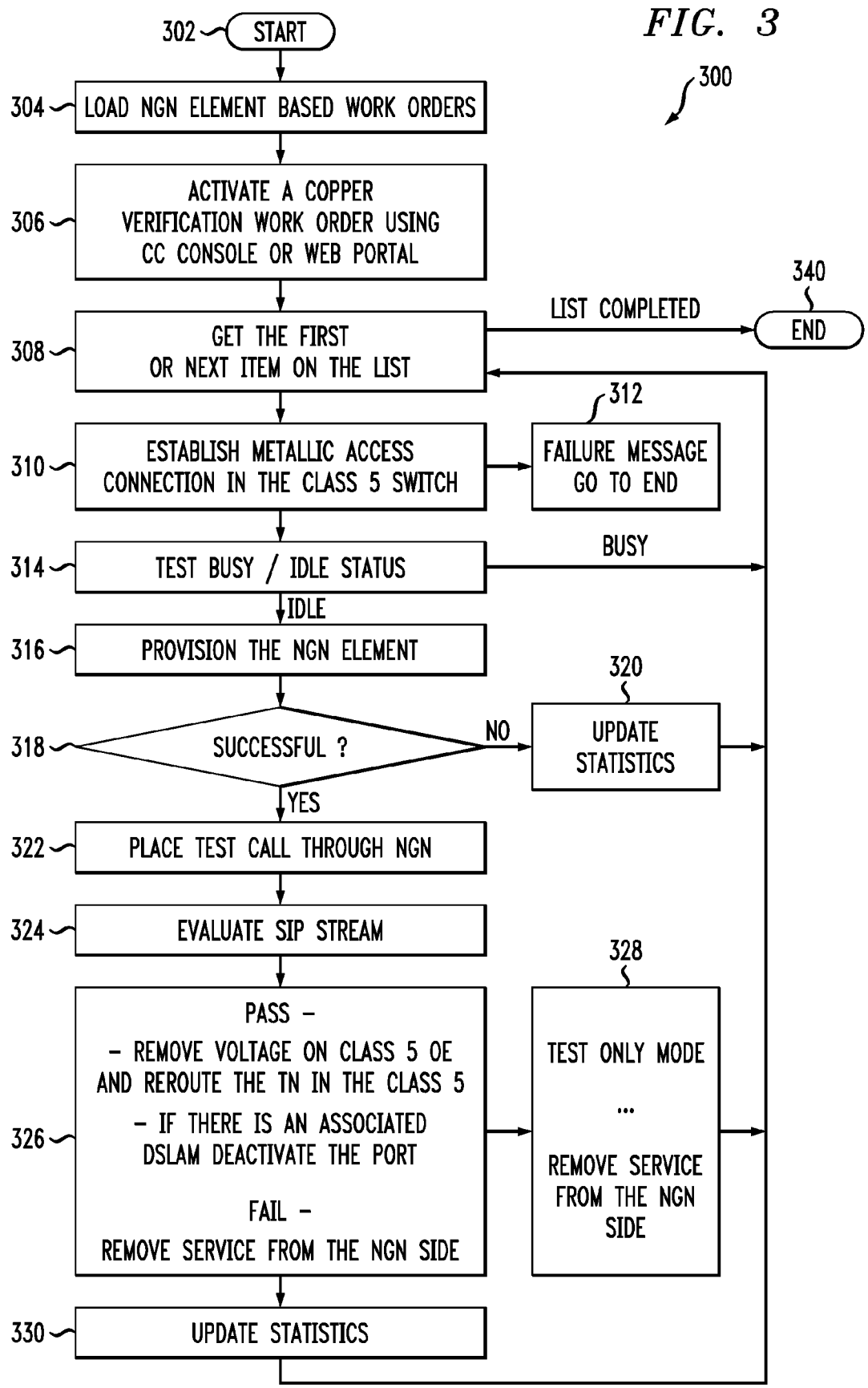

METHOD AND APPARATUS FOR TESTING NEW COPPER CONNECTIONS DURING MIGRATION FROM ANALOG NETWORK ELEMENTS TO NEXT GENERATION NETWORK (NGN) ELEMENTS

BACKGROUND OF THE INVENTION

This invention relates to a method and apparatus for testing new copper connections used in migrating lines from an analog system, such as a Public Switched Telephone Network (PSTN), to a Next Generation Network (NGN) system, such as a Voice Over Internet Protocol (VoIP) system.

While the invention is particularly directed to the art of connection verification in line migrations from, for example, PSTN to VoIP, and will be thus described with specific reference thereto, it will be appreciated that the invention may have usefulness in other fields and applications. For example, the invention may be used in other types of line migrations where copper lines are available.

By way of background, when migrating a telephone line from an analog switch, such as a class 5 PSTN switch, to a Next Generation Network (NGN) element, such as a VoIP network element, a copper wire connection is established between these elements. Present methods do not allow for appropriate testing of the new copper connection that is created during such a migration or replacement process.

In analog to analog conversions, this type of testing is available, and is referred to as a "Board To Board" test. In an analog to analog conversion, both lines are analog connections so they are accessed individually via a metallic access circuit on each Class 5 switch. The analog metallic access circuit is commonly referred to as the "Local Test Distributor". It provides copper access to the Class 5 line port under test. The metallic access circuits are connected to the same telephone number on the source switch and the replacement switch. Then, both metallic access circuits are connected to an apparatus that passes tones or continuity tests over the existing wiring to the co-terminated (usually a Main Distribution Frame double connection) replacement wiring in order to verify common copper connectivity to the line that will be moved to the replacement analog switch.

This method of testing is not possible between analog switches and replacement NGN elements because the NGN elements do not have metallic access circuitry. No other suitable method for this test is available.

In this regard, PSTN to NGN line migrations currently require moving each line connection from the PSTN to the NGN element, and then performing a manual test. This process is not suitable. For example, if the copper verification fails, restoring the NGN port to its previous state would be very difficult because it requires a back out procedure. Current methods do not provide such a back out procedure. When a manual Class 5 switch to NGN migration fails, it requires a manual repair in real time.

An alternative wiring continuity test is known. However, it is likewise not sufficient. This alternative test does not include tests to the actual replacement NGN dial tone port.

SUMMARY OF THE INVENTION

A method and apparatus for new copper connection verification during Public Switched Telephone Network (PSTN) to Voice over Internet Protocol (VoIP) line migrations are provided.

In one aspect of the invention, a method comprises selecting a telephone number for a telephone line to test, accessing the telephone line through the analog element using a metallic access circuit, determining if the telephone line is available to test, if the telephone line is available, activating the telephone number on the Next General Network element, placing a call through the metallic access circuit, capturing call flow data for the call on the Next Generation Network element, and, determining whether the copper connection is operating properly based on the call flow data.

In another aspect of the invention, the selecting comprises extracting the telephone number from a work list.

In another aspect of the invention, the determining if the telephone line is available includes placing the metallic access circuitry in bypass mode.

In another aspect of the invention, the determining if the telephone line is available includes detecting whether the line has voice frequencies thereon.

In another aspect of the invention, the method further comprises selecting a second telephone number if the telephone line is not available to test.

In another aspect of the invention, the capturing includes storing the call flow data in a data file.

In another aspect of the invention, the determining whether the copper connection is operating properly includes evaluating the call flow data to determine if the telephone number is in the call flow data.

In another aspect of the invention, the method further comprises de-activating the analog network element if the copper connection is determined to be operating properly.

In another aspect of the invention, the analog network is a Public Switched Telephone Network.

In another aspect of the invention, the analog element is a Class 5 switch.

In another aspect of the invention, the Next Generation Network element is a Voice over Internet Protocol element.

In another aspect of the invention a system comprises means for selecting a telephone number for a telephone line to test, means for accessing the telephone line through the analog element using a metallic access circuit, means for determining if the telephone line is available to test, means for activating the telephone number on the Next General Network element if the telephone line is available, means for placing a call through the metallic access circuit, means for capturing call flow data for the call on the Next Generation Network element, and, means for determining whether the copper connection is operating properly based on the call flow data.

In another aspect of the invention, a system comprises an analog network element, a Next Generation Network element, a copper connection between the analog network element and the Next Generation Network element, and, a control element operative to test the copper connection by placing a call through the analog network element and capture call flow data for the call through the Next Generation Network element.

In another aspect of the invention, the analog network is a Public Switched Telephone Network.

In another aspect of the invention, the analog element is a Class 5 switch.

In another aspect of the invention, the Next Generation Network element is a Voice over Internet Protocol element.

In another aspect of the invention, the control element is a control computer.

In another aspect of the invention, the control element is further operative to determine whether the copper connection is operating properly based on the call flow data.

In another aspect of the invention, the control element is further operative to de-activate the analog network element if the copper connection is determined to be operating properly.

In another aspect of the invention, all of the software steps required for line co-termination testing and NGN port activation that is coordinated with a Class 5 to NGN line migration are mechanized.

In another aspect of the invention, mechanization steps and interfaces for all network elements on a single device are provided.

In another aspect of the invention, a method further includes processing the migration based on a web portal request to the apparatus delivering the software changes to the network elements.

In another aspect of the invention, a method further includes validation of the request.

In another aspect of the invention, a method further includes statistical report generation of copper verification tests and optional line migration activity as it occurs.

In another aspect of the invention, a method further includes delivering support system and routing database changes concurrent with line migration.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

The presently described embodiments relate to a method and apparatus for testing new copper co-terminations disposed between analog elements, such as a PSTN Class 5 switches or other elements, and Next Generation Network (NGN) elements, such as a Multi-Service Access Node (MSAN) or an Intelligent Services Access Manager (ISAM). The contemplated testing is accomplished during analog line to Voice over Internet Protocol (VoIP) line migrations.

The presently described embodiments correlate all of the software tools needed to test the replacement copper connections for a line that will be migrated from an analog Class 5 element to a replacement NGN Internet Protocol (IP) based element. All of the end user requests are brokered into the specific network element input and the required call flow data that is needed to test the new copper connection and NGN line port is recovered. Optionally, the presently described embodiments migrate the line to the NGN switch or element by evolving both the Class 5 switch or element and NGN line provisioning status, and enabling and disabling ports as required.

More specifically, the presently described embodiments provide a previously unavailable method for NGN line software and wiring provisioning verification from an analog element, such as the noted Class 5 switch or other element, to the new NGN element over the new copper connection. This capability provides a minimal service interruption when the line is migrated to the NGN network from the analog network. The system verifies the new copper connection and, optionally, completes the migration of the line to the NGN element when the Copper Verification Connection tests pass.

In at least one form, the presently described embodiments mechanize or automate the required tests for this action in all network elements concurrently. In a least one form, each test or set of tests is requested via a Control Computer (CC) directly or through an optional Internet Web based request that the end user places to the apparatus. The user also receives status messages through the CC terminal responses during completion of the testing and/or migration process.

The system is operative to communicate with each network element in the native protocol of that element using the native commands and responses. Also, the system logs all activity and provides mechanized statistical reporting. Optionally, the system also has connectivity to any support system database that may require changes as the result of a Copper Verification test and/or optional line migration to the NGN network element. It also tests the NGN element's respective port to validate that the proper provisioning transactions have occurred on the NGN Switch.

Figure 1:
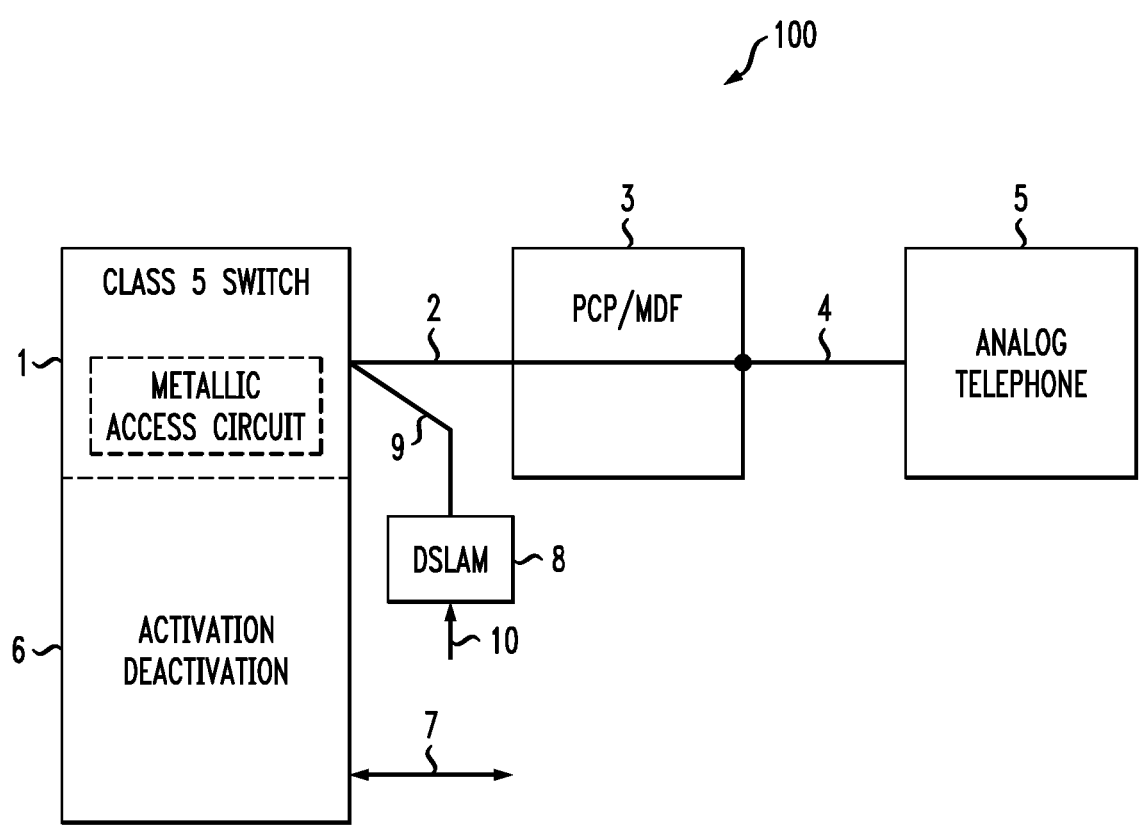
FIG. 1 is a representative block diagram into which the presently described embodiments may be incorporated.

Referring now to the drawings wherein the showings are for purposes of illustrating the exemplary embodiments only and not for purposes of limiting the claimed subject matter, FIG. 1 provides a view of a system 100 into which the presently described embodiments may be incorporated. As shown, FIG. 1 illustrates an example system 100 before line migration and before copper connectivity is established between the analog system and the Next Generation IP Network.

As shown, Element 1 represents an analog switch such as a Class 5 Switch that serves telephone subscribers on the Public Switched Telephone Network (PSTN) before migration to the NGN. Switch 1 includes a metallic access circuit. Link 2 represents the analog dial tone connection from the switch 1 through a local existing copper facility to the Primary Connection Point (PCP) 3, typically a street cabinet that is placed near the telephone subscriber.

This cabinet provides wiring flexibility for connection of the local copper cable from the Central Office to the copper wiring associated with the subscriber premises. The existing subscriber interface at the PCP 3 can be removed after the conversion/migration has been completed. So, the Primary Connection Point 3 will not be reused, but will be replaced by a NGN technology like a MSAM or ISAM.

Link 2 can alternately represent the analog dial tone connection from the Class 5 Switch 1 to the Main Distribution Frame (MDF) in a Central Office Building. So, element 3 can alternately represent the Main Distribution Frame in the Central Office. This frame provides wiring flexibility for connection of the analog switch or NGN element dial tone port to the subscriber's local copper cable. The MDF will be reused after the migration.

Element 4 represents the local copper loop to the subscriber's premises. Element 5 represents the analog telephone that is in use before line migration. Both of these elements will be reused after migration.

Element 6 represents the provisioning software that is used to activate and deactivate the Class 5 line. Link 7 represents electronic connection the Class 5 Switch Element 5 provisioning software capability. Element 8 represents a Digital Subscriber Line Access Multiplexer (DSLAM). It provides broadband access for the analog line through link 9, element 3 and link 4.

Link 9 represents the copper connection from the optionally assigned DSLAM port to the subscriber's local loop. Link 10 represents the provisioning interface for the DSLAM.

To migrate a telephone line from a switch 1 to a replacement Next Generation Network (NGN) element (not shown), a copper connection (not shown) is established between the analog or PSTN network and the NGN network. As noted above, it will be appreciated that current techniques do not allow for the suitable testing of this new copper connection.

Figure 2:
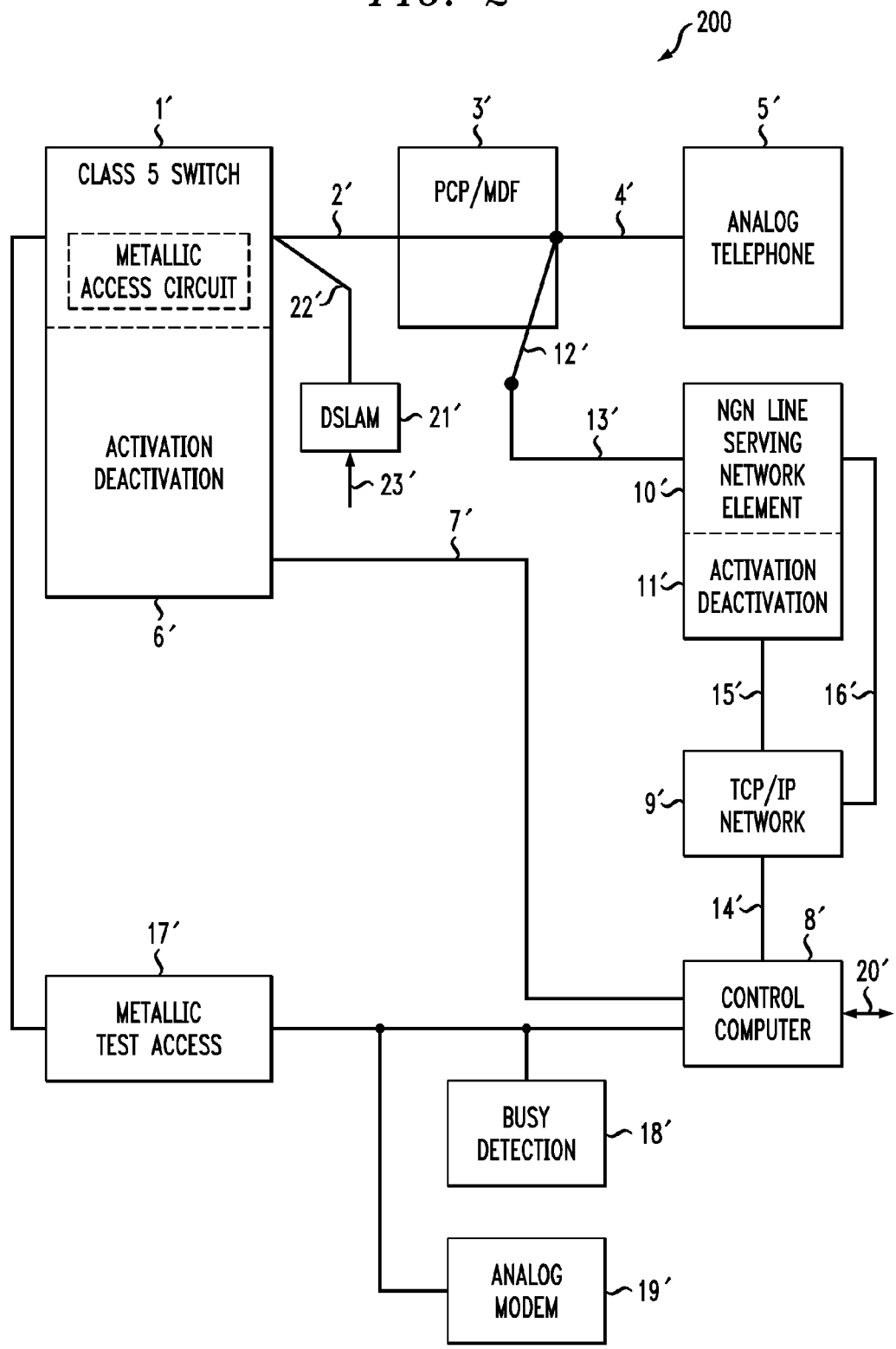
FIG. 2 is a representative block diagram illustrating the presently described embodiments; and, FIG. 3 is a flow chart illustrating a method according to the presently described embodiments.

Referring now to FIG. 2, an example system 200 illustrating implementation of the presently described embodiments—which includes the placement of a Control Computer 8' into the system 200 during the Copper Verification and line migration process—is shown. The Control Computer 8' only needs to be active in the network during the customer defined transition period. It is not typically a permanent network element. However, it could be a permanent element in the system.

In FIG. 2, an analog switch 1', such as a Class 5 switch that serves telephone subscribers on the Public Switched Telephone Network (PSTN), is shown. Switch 1' includes a metallic access circuit. It should be understood that other analog elements may also be included In addition to or as a replacement for the switch 1' in a network into which the presently described embodiments are implemented.

Link 2' represents the analog dial tone connection from the switch 1' through the local existing copper facility to the Primary Connection Point (PCP) 3', a street cabinet that is placed near the telephone subscriber. The existing subscriber interface at the PCP can be removed after the conversion/migration has been completed. This cabinet provides wiring flexibility for connection of the local copper cable from the Central Office to the copper wiring at the subscriber premises. The existing subscriber interface at the PCP can be removed after the conversion/migration has been completed, and will be replaced by a NGN technology like a MSAM or ISAM.

Link 2' can alternately represent the analog dial tone connection from the Class 5 Central Office switch to the Main Distribution Frame in the Central office. So, element 3' can alternately represent the Main Distribution Frame in the Central Office. This frame provides wiring flexibility for connection of the analog switch or NGN element dial tone port to the subscriber's local copper cable. The MDF will be reused after migration.

Element 4' represents the local copper loop to the subscriber's premises. Element 5' represents the analog telephone that is in use before line migration. Both of these elements will be reused after migration.

Element 6' represents the provisioning software that is used to deactivate or reactivate the Class 5 side of the line under test. Link 7' represents an electronic connection to the provisioning software support system interface from the Control Computer 8'.

As noted above, the Control Computer 8' is provided in the system. It will be understood that Busy Detection or Verification circuitry and an Analog Modem are a part of or integrated with the Control Computer 8'.

The Control Computer may take a variety of forms to achieve the objectives of the presently described embodiments—including forms having a variety of hardware configurations and software implementations. In at least one form, all of the telecommunications provisioning capabilities, network access capabilities, software mapping and software back out tools are centralized on the Control Computer 8'. In one form, the Control Computer 8' is placed physically near the metallic access circuitry of the switch 1'. The Control Computer 8' is operative to control the metallic access circuit of the switch 1' by applying the correct voltage potentials and multi-frequency signals to the circuit. The Control Computer 8' also has connectivity on the customer's network segment that has access to the associated Class 5 switch, NGN element and DSLAM provisioning interfaces.

User access to the Control Computer 8' is typically accomplished through input devices such as a keyboard and mouse. This apparatus can be accessed optionally via an Internet Web Based request. Also, the console display or web page associates all testing results. When the end user requests a set of Copper Verifications/Migrations, the computer automatically issues console or web page updates and visual indications that direct the end user through the testing and optional migration process.

Element 9' represents the TCP/IP network that is used to monitor and provision the NGN elements for the lines under test. Element 10' represents the NGN line serving element (for instance an MSAN or ISAM via Soft Switch control). Element 11' represents the NGN provisioning software that is used to activate and deactivate the NGN line.

Link 12' represents the new copper co-termination between the subscriber loop and the NGN dial tone port. It is typically co-terminated with the Class 5 tip and ring at the local cable pair on the MDF or the subscriber's premises loop at the PCP.

Link 13' represents the connection to the dial tone port on the NGN element. Link 14' represents the NGN IP connection to the Control Computer. This link is used for call flow captures (e.g. Session Initiated Protocol, H.248 protocol or NGN log files) and NGN element provisioning.

Link 15' represents the IP connection to the NGN dial tone port Activation/Deactivation provisioning software capability. Connection to this link is available through link 14' and element 9'. Link 16' represents a call flow (e.g. Session Initiated Protocol, H.248 protocol or NGN log files) data collection stream connection. Connection to this link is available through link 14' and element 9'.

Link 17' represents the metallic access connection to the Class 5 switch or other element, including the metallic access circuit. This connection provides exclusive access to the subscriber line under test.

Link 18' represents a metallic access connection between the metallic access link 17' and the busy detection circuit, resident as part of the Class 5 element test functionality. Link 19' represents the Analog Modem link that will be used to place test calls over link 17' through the metallic access circuit in the bypass mode to the NGN element's dial tone port. In some instances it may also be used to send the signals to the metallic access circuit.

Link 20' represents connection to support system database update mechanisms. This link can be informational on the customer's TCP/IP internal network or a TCP/IP port that can deliver the information through electronic processes such as email or File Transfer Protocol. It can also be used to access the Control Computer remotely.

Element 21' represents a Digital Subscriber Line Access Multiplexer (DSLAM). It provides broadband access for the analog line through link 9', element 3' and link 4'. Link 22' represents the copper connection from the optionally assigned DSLAM port to the subscriber's local loop. Link 23' represents the provisioning interface for the DSLAM.

In operation, a Telephone Number (TN) under test is accessed in the switch 1' via the metallic access circuit under the control of the Control Computer 8'. Next, the metallic access circuit is placed in the bypass mode. In the bypass mode, the Control Computer 8' has exclusive access to the tip and ring wiring of the line under test from the switch side. The Control Computer 8' now operates a voice or busy detection circuit to determine the busy/idle status of the line. If busy, the line is flagged for retest later, and the test trunk is reset for the next line under test. If idle, the test process proceeds under program control of the Control Computer. At this point, the NGN dial tone port has been co-terminated to the tip and ring path of the Class 5 switch dial tone port, usually at the local cable and pair that serves the subscriber line that will be migrated. In addition, the NGN element has dial tone in a suspended state. Subsequently, there is no voltage potential or dial tone on the NGN port. On the Class 5 switch side, dial tone and voltage potential have been disabled as a function of the seizure by the metallic access circuit. The NGN port of, for example, the element 10' is now provisioned for dial tone by the Control Computer 8'. Next, the Control Computer 8' waits for dial tone from the NGN port via the Analog Modem. If dial tone is not returned by the NGN port in the allotted time, the TN is flagged as an error condition and the trunk is reset for the next line under test. If dial tone is returned by the NGN port, the test proceeds under program control. The Control Computer 8' now places a test call over the NGN port via the Class 5 switch tip and ring connection through the metallic access circuit in the Class 5 switch from the Analog Modem. As the test call is being placed, the NGN call flow data stream is being collected by the Control Computer 8'. Shortly after the call is routed, the collected call flow data is evaluated against expected values. If the test call telephone number and the expected NGN port are in the call flow data, continuity over the replacement copper connection to the correct NGN port has been verified. The replacement wiring, the NGN port, and NGN provisioning status have been completely tested. The NGN line is now available for service. At this point, the Class 5 line can be disabled and the number from the PSTN perspective can be rerouted to the NGN by the Control Computer 8' through the use standard input messages to the Class 5 switch. If the line under test/migration is wired to a Digital Subscriber Line Access Multiplexer (DSLAM), the DSLAM port is also disabled by the Control Computer 8'. The migration at this point would be complete. If migration is not desired at this time, the Control Computer 8' returns the NGN port to its previous state.

With reference now to FIG. 3, a method 300 representing such operation of the presently described embodiments is shown. It should be appreciated that the method 300 may be implemented in a variety of different manners. For example, a variety of different hardware configurations and software techniques may be used to implement the method. In one form, such software routines are primarily controlled and/or run on the Control Computer 8'. In other forms, the software routines may be distributed throughout the network on various hardware elements. In still other forms, hardware configurations may be used to implement the presently described embodiments. In still other forms, combinations of these approaches may be implemented.

In one form, it will be understood that the method is started (at 302) after an end user requests test sets through menu choices on the computer screen of the Control Computer 8'. The test sets will also be referred to as Work Orders. Work Orders are text files that are placed on the Control Computer 8' in a predefined folder when the co-terminations and NGN element are ready for test (at 304). Work Orders are NGN element based and the key field in the Work Order is the telephone number to be tested. The Work Order may include from one line to all of the lines to be migrated to the NGN element.

When the Copper Verification program is running on the Control Computer 8', a window with a list of valid Work Orders is displayed. The end user selects a Work Order from the on screen list and activates it as a Test Only or Test and Migrate process (at 306).

From this point forward, the Control Computer 8' mechanizes or automates all processes. The Control Computer 8' retrieves the first entry in the Work List (at 308). The telephone number to test will be embedded in the Work List entry. Again, it is the key field in the entry. Normally, this telephone number will be the same number for both the analog or Class 5 and the NGN element. If no items remain for processing, the process is ended (at 340). However, if an item on the Work Order is to be processed, the Control Computer 8' accesses the number on the Work List entry using the Class 5 metallic access circuit (at 310). If the line cannot be accessed, a failure message it provided and the process is ended (at 312). If the line is accessed, the metallic access circuit is placed in the bypass mode where testing for voice is conducted (at 314). In this mode, the Control Computer 8' will be able to "listen" to the copper co-termination for voice activity using the busy detection circuit. The busy detection circuit on the Control Computer 8' will activate if a voice frequency is detected. If voice frequency is detected, the line is considered in use by the subscriber and the Control Computer 8' proceeds to the next entry (at 308) on the Work Order. If a voice frequency is not detected, the telephone number is activated on a port of the NGN element, such as NGN Line Serving Network element 10' (at 316). Next, the Control Computer 8' waits for dial tone from the port for the NGN element on link 19' (at 318). If dial tone is not returned by the NGN port in the allotted time, the TN is flagged as an error condition and the connection is reset for the next line under test (at 320). If dial tone is detected, the Control Computer 8' activates a session that captures the call flow data stream originating from the NGN element 10', flowing through the network 9' to link 14' (at 322). This data is stored in a data file, in one form. Using the analog modem in or on the Control Computer 8', a test call is placed on the NGN over the metallic access circuit on links 19' and 17' to the NGN line port to a predefined test number. After the call routing completes, call flow data capture is disabled on the Control Computer 8' and the resultant data file is evaluated for expected results (at 324). A determination is then made as to the success or failure of the test and resultant action (at 326). If the call from the expected NGN port on the Work Order entry to the test number is found, the new copper connection and the NGN dial tone port have been tested for proper functionality. If this is a Test and Migrate process, the line is deactivated in the analog or Class 5 Switch and the intra-switch routing is changed by the Control Computer 8' over the Class 5 Switch provisioning interface. If the line under test migration is wired to a Digital Subscriber Line Access Multiplexer (DSLAM), the DSLAM port is also disabled by the Control Computer 8'. If the test fails, service is removed from the NGN side. If this is a Test Only process, the NGN service is removed by the Control Computer 8' (at 328). In any event, the statistics are updated (at 330) and the process is returned to 308. So, this set of actions is repeated for each item on the Work Order.

The benefits of the method and apparatus in this invention include:

1. The end user can schedule the testing and optional migration pace to coincide with the placement, wiring and programming of the NGN elements.
2. This method reduces conversion risk and installation skill requirements.
3. The lines can be tested and optionally migrated in real time at any time of the day, the only requirement being that the line must not be in use by the subscriber during the test and migration period (approximately 10 seconds).
4. If the line is in use by the subscriber (busy), the list entry will be temporarily bypassed and the test and optional migration for that entry will be automatically retried 2 times when all other items on the Work Order have been completed.
5. The end user can request test only or test and migrate.
The process delivers electronic progress reports to the administrators and the end user.
6. Security is enhanced because of the inventions apparatus control and physical placement.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for testing a copper connection between an analog network element and a Next Generation Network element, the method comprising:
   selecting a telephone number for a telephone line to test;
   accessing the telephone line through the analog element using a metallic access circuit;
   determining if the telephone line is available to test;
   if the telephone line is available, activating the telephone number on the Next General Network element;
   placing a call through the metallic access circuit;
   capturing call flow data for the call on the Next Generation Network element; and
   determining whether the copper connection is operating properly based on the call flow data.

2. The method as set forth in claim 1 wherein the selecting comprises extracting the telephone number from a work list.

3. The method as set forth in claim 1 wherein the determining if the telephone line is available includes placing the metallic access circuitry in bypass mode.

4. The method as set forth in claim 1 wherein the determining if the telephone line is available includes detecting whether the line has voice frequencies thereon.

5. The method as set forth in claim 1 further comprising selecting a second telephone number if the telephone line is not available to test.

6. The method as set forth in claim 1 wherein the capturing includes storing the call flow data in a data file.

7. The method as set forth in claim 1 wherein the determining whether the copper connection is operating properly includes evaluating the call flow data to determine if the telephone number is in the call flow data.

8. The method as set forth in claim 1 further comprising de-activating the analog network element if the copper connection is determined to be operating properly.

9. The method as set forth in claim 1 wherein the analog network is a Public Switched Telephone Network.

10. The method as set forth in claim 1 wherein the analog element is a Class 5 switch.

11. The method as set forth in claim 1 wherein the Next Generation Network element is a Voice over Internet Protocol element.

12. A system for testing a copper connection between an analog network element and a Next Generation Network element, the system comprising:
    means for selecting a telephone number for a telephone line to test;
    means for accessing the telephone line through the analog element using a metallic access circuit;
    means for determining if the telephone line is available to test;
    means for activating the telephone number on the Next General Network element if the telephone line is available;
    means for placing a call through the metallic access circuit;
    means for capturing call flow data for the call on the Next Generation Network element; and
    means for determining whether the copper connection is operating properly based on the call flow data.

13. A system for testing a copper connection between an analog network and a Next Generation Network, the system comprising:
    an analog network element;
    a Next Generation Network element;
    a copper connection between the analog network element and the Next Generation Network element; and
    a control element operative to test the copper connection by placing a call through the analog network element and capture call flow data for the call through the Next Generation Network element.

14. The system as set forth in claim 13 wherein the analog network is a Public Switched Telephone Network.

15. The system as set forth in claim 13 wherein the analog network element is a Class 5 element.

16. The system as set forth in claim 13 wherein the analog element is a Class 5 switch.

17. The system as set forth in claim 13 wherein the Next Generation Network element is a Voice over Internet Protocol element.

18. The system as set forth in claim 13 wherein the control element is a control computer.

19. The system as set forth in claim 13 wherein the control element is further operative to determine whether the copper connection is operating properly based on the call flow data.

20. The system as set forth in claim 19 wherein the control element is further operative to de-activate the analog network element if the copper connection is determined to be operating properly.

* * * * *